UNITED STATES PATENT OFFICE.

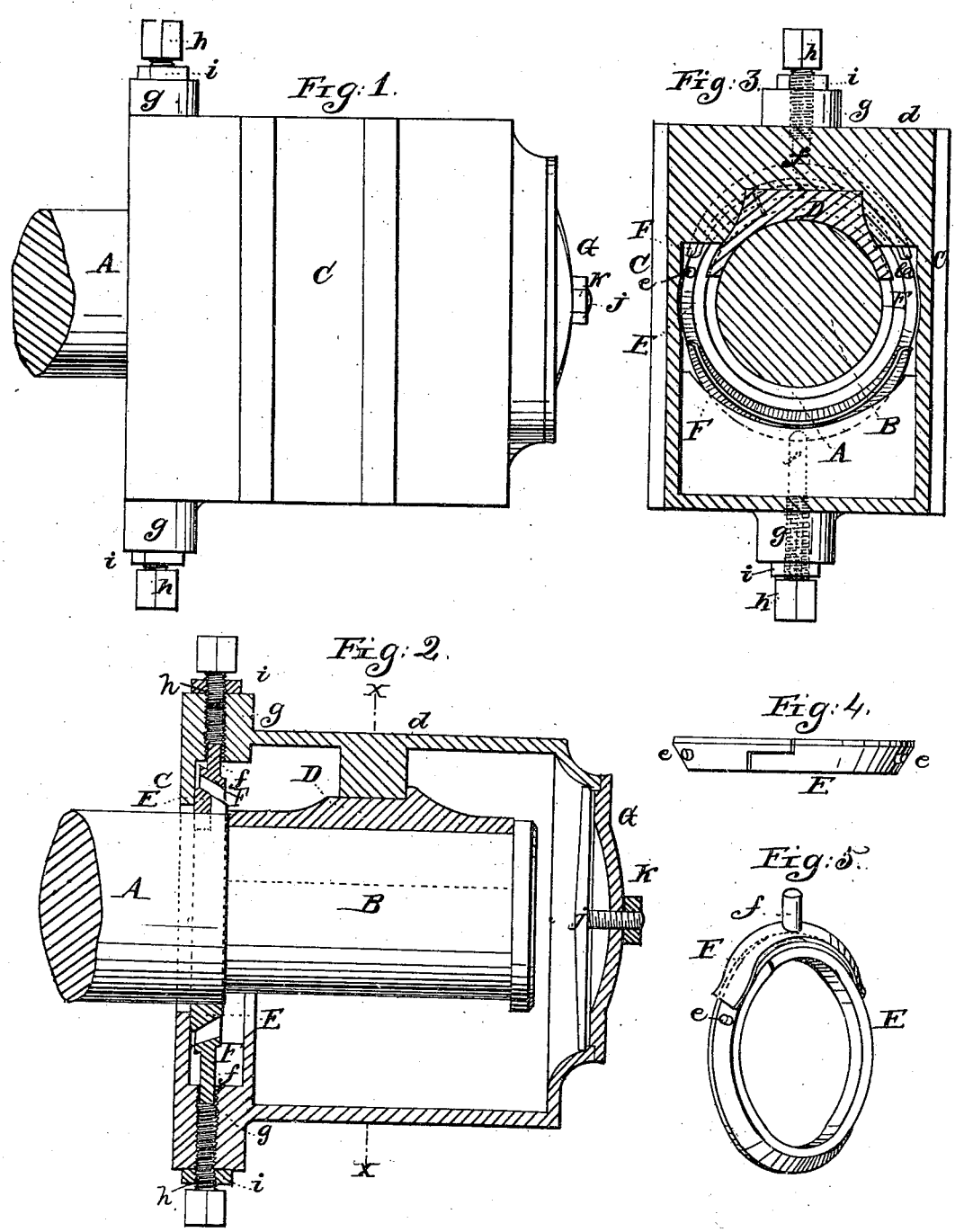

WM. H. HOVEY, OF HARTFORD, CONNECTICUT.

PACKING-BOX AND AXLE.

Specification of Letters Patent No. 7,563, dated August 13, 1850.

*To all whom it may concern:*

Be it known that I, WILLIAM H. HOVEY, of Hartford, in the county of Hartford and State of Connecticut, have invented a new and useful Improvement in a Journal-Box for Car-Axles, or for any Description of Machinery; and I do hereby declare that the following is a full, clear, and exact description of the same, reference being had to the accompanying drawings, forming part of this specification, in which—

Figure 1 is a side elevation of a journal box for a car axle. Fig. 2 is a longitudinal vertical section of the same through the center. Fig. 3 is a transverse vertical section of the same through the dotted lines $x$, $x$, in Fig. 2. Fig. 4 is an edge view of the packing ring. Fig. 5 is a perspective view of the packing ring showing the application of one of the springs.

Similar letters refer to corresponding parts in each of the several figures.

The nature of my improvement consists in the application to the inside of the journal box of a metallic packing ring fitting accurately to the axle or shaft close to the journal, and acted upon by springs in such a manner as to keep it (the ring) fitting to the shaft notwithstanding the wear by friction and to force it up to the face of the inside of the box so as to form a tight joint which will prevent the escape of the oil or other lubricating material from the box and will exclude dust, dirt, &c. from the bearing.

To enable others skilled in the art to make and use my invention I will proceed to describe its construction and operation.

A represents the end of the axle the remaining part being broken off for convenience of representation.

B, is the journal.

C, is the journal box which is of cast iron of suitable strength. It is provided with a hole in its back or inside plate $c$, of larger diameter than the shaft, the inner face of the plate $c$ must have a plane or smooth surface. D, is the bearing which is fitted to the journal and to the rest $d$, on the upper side of the journal box which rests upon it.

E, is the packing ring which may be made of any suitable metal, it is accurately fitted to the axle A, which is cylindrical at the part which fits the ring—the ring is cut apart in the manner shown in Fig. 4—two notches being cut half way across it some distance apart and a slit being made from one notch to the other, its outer periphery is of conical form being of smaller diameter at the face farthest from the plate $c$, and is provided with two small pins or stops $e$, $e$.

F, F, are arched springs having their bearing points inclined to fit the ring E, and are provided with shanks $f$, $f$, fitting in sockets $g$, $g$, forming part of the box C.

$h$, $h$, are regulating screws fitting in female screws in the sockets $g$, $g$, and bearing on the ends of the shanks $f$, $f$.

$i$, $i$, are set nuts for securing the screws $h$, $h$.

G is a plate or cap fitting closely to the front or outside of the journal box and secured by a bolt $j$, and nut $k$.

The box is filled with lubricating material by taking off the cap G, and inserting it through the aperture in the front side. The pressure of the springs F, F, on the packing ring E, may be regulated by the screws $h$, $h$, and will always keep the ring tight to the axle, the slit in the ring allowing it to close upon the shaft as the inside wears by friction, the springs bearing on the conical periphery of the ring will always force the broad face of it close up to the inside face of the plate $c$, and form a close joint sufficiently tight to prevent the escape of the lubricating material and to exclude the dirt from the box, the packing ring will be kept stationary by means of the stops $e$, $e$, which would be caught by the ends of the springs and would prevent the ring from rotating with the axle.

What I claim as new and desire to secure by Letters Patent is—

The combination of the metallic packing ring E, having its outer periphery of conical form, the arched springs F, F, having their ends inclined to fit the said ring E, and the regulating screws $h$, $h$, with the journal box C, and the axle A, in the manner and for the purposes substantially as herein described.

WM. H. HOVEY.

Witnesses:
WALTER BROWN,
R. R. BUCK.